(12) United States Patent
Abbott

(10) Patent No.: US 9,438,096 B2
(45) Date of Patent: Sep. 6, 2016

(54) ELECTRIC MOTOR AND MAGNETIC GEAR

(71) Applicant: Timothy D. Abbott, Orchard Park, NY (US)

(72) Inventor: Timothy D. Abbott, Orchard Park, NY (US)

(73) Assignee: PRAXAIR TECHNOLOGY, INC., Danbury, CT (US)

( * ) Notice: Subject to any disclaimer, the term of this patent is extended or adjusted under 35 U.S.C. 154(b) by 303 days.

(21) Appl. No.: 14/315,448

(22) Filed: Jun. 26, 2014

(65) Prior Publication Data

US 2015/0037180 A1 Feb. 5, 2015

Related U.S. Application Data

(60) Provisional application No. 61/859,988, filed on Jul. 30, 2013.

(51) Int. Cl.

| *H02K 49/10* | (2006.01) |
| *H02K 16/00* | (2006.01) |
| *H02K 51/00* | (2006.01) |
| *H02K 16/04* | (2006.01) |
| *H02K 7/11* | (2006.01) |
| *F04D 25/06* | (2006.01) |
| *F04D 17/10* | (2006.01) |

(52) U.S. Cl.
CPC ............... *H02K 51/00* (2013.01); *H02K 7/11* (2013.01); *H02K 16/00* (2013.01); *H02K 16/04* (2013.01); *H02K 49/102* (2013.01); *F04D 17/10* (2013.01); *F04D 25/06* (2013.01)

(58) Field of Classification Search
CPC ................. H02K 51/00; H02K 16/00–16/04; H02K 49/00–49/12
USPC ......... 310/103, 104, 112, 114, 266; 417/420
See application file for complete search history.

(56) References Cited

U.S. PATENT DOCUMENTS

| 4,945,296 A * | 7/1990 | Satake .................. H02K 17/36 310/112 |
| 2007/0090707 A1* | 4/2007 | Moriya .................. B60K 6/26 310/113 |
| 2010/0219706 A1* | 9/2010 | Watanabe ............. B60K 6/543 310/107 |
| 2011/0163623 A1 | 7/2011 | Rens et al. |

FOREIGN PATENT DOCUMENTS

GB 2493484 A 2/2013

* cited by examiner

*Primary Examiner* — Thomas Truong
(74) *Attorney, Agent, or Firm* — Robert J. Hampsch; David M. Rosenblum

(57) ABSTRACT

An electric motor that can be used in driving a compressor and that incorporates a magnetic gear. The motor has high and low speed stators mounted within a motor casing side-by-side that drive coaxial low and high speed rotors also mounted within the motor casing for rotation and within the high and low speed stators. The high and low speed stators produce rotating magnetic fields that rotate in opposite directions to drive the rotors under application of a multiphase alternating current. The low speed rotor has a set of ferrous pieces, rotating with the low speed rotor and mounted thereon between the high speed rotor and the high speed stator. The ferrous pieces produce a magnetic gearing effect to drive the high speed rotor at a higher speed than the low speed rotor and in an opposite direction to the low speed rotor.

19 Claims, 3 Drawing Sheets

ELECTRIC MOTOR AND MAGNETIC GEAR

CROSS REFERENCE TO RELATED APPLICATIONS

This application claims priority to and the benefit of U.S. provisional patent application Ser. Nos. 61/859,988 filed on Jul. 30, 2013; the disclosure of which is incorporated by reference herein.

FIELD OF THE INVENTION

The present invention relates to an electric motor and magnetic gear that can be employed in the electric motor in which a stator responsive to a multiphase alternating current generates rotating magnetic fields that drive a high speed rotor and a low speed rotor having ferrous pieces and rotating between the stator and high speed rotor produces a gearing effect such that the high speed rotor rotates at a higher speed than rotating magnetic field of the stator and in an opposite direction to rotation of the magnetic fields. The present invention also relates to a combination employing such an electric motor and a compressor directly coupled to and driven by the high speed rotor.

BACKGROUND

Alternating current motors are used in many industrial applications where it is desired to operate devices, such as compressors, at high speed. Typically, where high powers are required, the motor is designed to be powered by a three phase alternating current source. The three phase alternating current source generates three electrical currents of the same frequency which are out of phase from one another by one third of a cycle. Thus, when one of the electrical currents reaches its maximum amplitude, one of other electrical currents will reach a maximum amplitude one third of a cycle later and the third of the electrical currents will reach its maximum amplitude two thirds of a cycle later. In a three-phase electric motor separate windings are provided in a stator and are connected to each other and the three phase alternating current source so as to generate a magnetic field that rotates around the stator. This rotating magnetic field is able to induce motion in a rotor, rotating within the stator by provision of pole pieces on the rotor. The rotating magnetic field acts upon pole pieces formed by bars, coils or permanent magnets to induce a rotation of the rotor.

Three phase electric motors can incorporate magnetic gearing to either increase the speed of a rotor or decrease the speed of a rotor and impart more torque by such a rotor. An example of this is shown in U.S. Patent Appln. No. 2011/0163623. In this publication, an inner rotor is provided that contains windings which form electromagnets when the windings are supplied by an electric current. An outer rotor rotates around the inner rotor that has a number of pole-pieces. Surrounding the outer rotor are a series of permanent magnets connected to a fixed stator. The pole pieces of the outer rotor allow fields of the permanent magnets in the fixed stator to interact with the windings of the inter rotor so that rotation of the outer rotor causes the inner rotor to rotate and vice versa. The inner rotor rotates at a higher speed than the outer rotor. An outer stator is provided to rotate the inner rotor. When a three phase alternating current is applied to windings contained in the outer stator and power is supplied to the windings of the inner rotor, the inner rotor will rotate in a manner described above and at the same speed as the rotating magnetic field produced by the three phase alternating current and in the same direction. Such rotation will induce rotation in the outer rotor at a lower speed and a higher torque. The outer rotor can thereby be connected to a load that requires low speed and high torque. Thus the outer rotor containing the pole pieces is magnetically geared to the inner rotor by means of the permanent magnets connected to the fixed stator. It is to be noted that in a magnetic gear arrangement shown in GB 2493484 A, the permanent magnets can be replaced by electromagnets and the windings of the inner rotor can be replaced by permanent magnets. In such a geared arrangement, rotation of the outer rotor containing pole pieces will induce rotation in the inner rotor containing the permanent magnets at a higher speed than the outer rotor.

A motor containing a geared arrangement such as shown in the published patent applications referenced above, contemplates that the inner high speed rotor to rotate at a speed induced by the three phase alternating current applied to outer winding driving the inner high speed rotor. As will be discussed, among other advantages, the present invention provides an electric motor in which the inner high speed rotor will rotate at a greater speed than the rotating magnetic field produced in the stator.

SUMMARY OF THE INVENTION

The present invention, in one aspect, is directed toward an electric motor. The electric motor comprises a motor casing and a high speed stator and a low speed stator mounted within the motor casing side-by-side. The high speed stator and the low speed stator each include winding systems having separate windings and electrical connections between the separate windings configured such that the separate windings are able to be separately exited by out-of-phase electrical currents generated by a multiphase alternating current source and thereby to produce magnetic fields emanating from stator pole pairs of the separate windings. The magnetic fields rotate around each of the high speed stator and the low speed stator in opposite directions when the windings are connected to the multiphase alternating current source. A low speed rotor is mounted within the motor casing for rotation, coaxial to and surrounded by the high speed stator and the low speed stator. The low speed rotor has a first set of pole pieces mounted at one end thereof and opposite to the low speed stator such that the magnetic fields produced by the low speed stator are able to induce a rotation of the low speed rotor in a rotation direction of the of the magnetic fields produced by the low speed stator. A set of ferrous pieces are mounted at the other end of the low speed rotor and opposite to the high speed stator. The set of ferrous pieces are separated from one another by non-ferrous regions of the low speed stator so as to be able to conduct the magnetic fields produced by the high speed stator. A high speed rotor is also mounted within the motor casing for rotation coaxial to the low speed rotor and telescoped within the low speed rotor. The high speed rotor has a second set of pole pieces opposite to the ferrous pieces of the low speed rotor and the high speed stator. The set of ferrous pieces of the low speed rotor is present in a number equal to a sum of the stator pole pairs of the high speed stator and rotor pole pairs provided by the pole pieces of the high speed rotor so that motion of the ferrous pieces produced by the rotation of the low speed rotor in turn produces a gearing effect in which the high speed rotor rotates at a higher speed than the magnetic fields produced by the high speed stator and in an opposite direction thereto.

The higher speed of the high speed rotor can be described by the equation: $[60(f)(1+(P1:P2))(P1:P3)]/P1$ for an even number of ferrous pieces or the amount derived from the foregoing equation plus $60(f)/P2$ for an odd number of ferrous pieces; where "f" is the frequency of the multiphase alternating current source; P1 is the number of pole pairs on the high speed stator; P2 is the number of pole pairs on the low speed stator and P3 is the number of pole pairs on the high speed rotor.

Unlike the prior art, since the magnetic field produced by the high speed stator is leveraged by the ferrous pieces and motion of the low speed rotor, the high speed rotor is able to rotate at a speed that is a multiple of the rotational speed of the magnetic field produced by the high speed stator. This high speed allows an electric motor to be used in high speed applications such as are required in gas compression. Thus, in a further aspect, the present invention provides a motor as described above and in combination with a compressor. The compressor is directly coupled to the high speed rotor to compress a fluid within a process plant. The compressor can be a centrifugal compressor and the centrifugal compressor can be configured to compress air.

As would be appreciated by those skilled in the art, the magnetic gearing provided in the electric motor of the present invention has wider applicability than motors. For example, such a gear could be wherever an electro-mechanical transmission were desired. Consequently, in yet a further aspect, the present invention is directed to a magnetic gear comprising a casing, and a stator mounted within the casing. The stator includes a winding system having separate windings and electrical connections between the separate windings configured such that the separate windings are able to be separately exited by out-of-phase electrical currents generated by a multiphase alternating current source and thereby to produce magnetic fields emanating from stator pole pairs of the separate windings. The magnetic fields rotate around the stator when the windings are connected to the multiphase alternating current source. A low speed rotor is mounted within the casing for rotation, coaxial to and surrounded by the stator, the low speed rotor. The low speed rotor has a set of ferrous pieces located opposite to the stator and separated from one another by non-ferrous regions of the low speed stator so as to be able to conduct the magnetic fields produced by the stator. A high speed rotor is mounted within the casing for rotation coaxial to the low speed rotor and telescoped within the low speed rotor. The high speed rotor has a set of pole pieces opposite to the ferrous pieces of the low speed rotor and the stator. The set of ferrous pieces of the low speed rotor are present in a number equal to a sum of the stator pole pairs of the stator and rotor pole pairs provided by the pole pieces of the high speed rotor so that motion of the ferrous pieces produced by the rotation of the low speed rotor in turn produces a gearing effect in which the high speed rotor rotates at a higher speed than the magnetic fields produced by the stator and in an opposite direction thereto.

In any aspect of the present invention, the alternating current source can be a three phase alternating current source. Further, the low speed rotor can be formed of a non-ferrous material and be of cylindrical configuration. The low speed rotor can be provided with cavities within which the pole pieces and the ferrous pieces are mounted. Further, the stator, which in case of the electric motor would be the high speed stator, can have three pole pairs, the high speed rotor can have one rotor pole pair and four ferrous pieces can be provided on the low speed rotor. Each of the pole pieces can be formed by permanent magnet materials. Each stator of an electric motor or a magnetic gear can be of laminated construction having inwardly directed prongs supporting the windings. In the electric motor aspect of the present invention, the windings of the high speed stator and the low speed stator can be wound in opposite directions and are configured to share the multiphase alternating current source.

BRIEF DESCRIPTION OF THE DRAWINGS

While the specification concludes with claims distinctly pointing out the subject matter that Applicant regard as his invention, it is believed that the invention will be better understood when taken in connection with the accompanying drawings in which:

DETAILED DESCRIPTION

Figure 1:
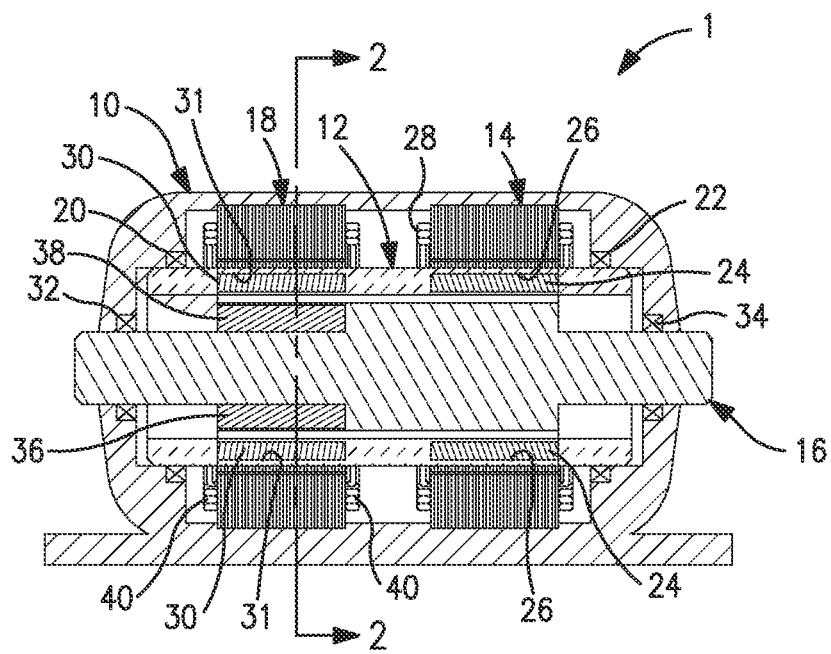
FIG. 1 is a schematic, sectional view of an electric motor in accordance with the present invention.

With reference to FIG. 1, an electric motor 1 in accordance with the present invention is illustrated. Electric motor 1 has a motor casing 10, a low speed rotor 12 that rotates under the influence of rotating magnetic fields produced by low speed stator 14. A high speed rotor 16 rotates under the influence of rotating magnetic fields produced by high speed stator 18. The motion of ferrous pieces 28, carried by low speed rotor 16, act in a gearing effect to increase the speed of the high speed rotor 16 above that of the speed of rotation of the magnetic fields produced by the high speed stator 18 and in an opposite direction of such magnetic fields. Such high speed rotor 16, as indicated above, could be directly connected to a compressor, such as a centrifugal compressor used in compressing air in an air separation plant or a vacuum pressure swing adsorption unit.

Figure 2:
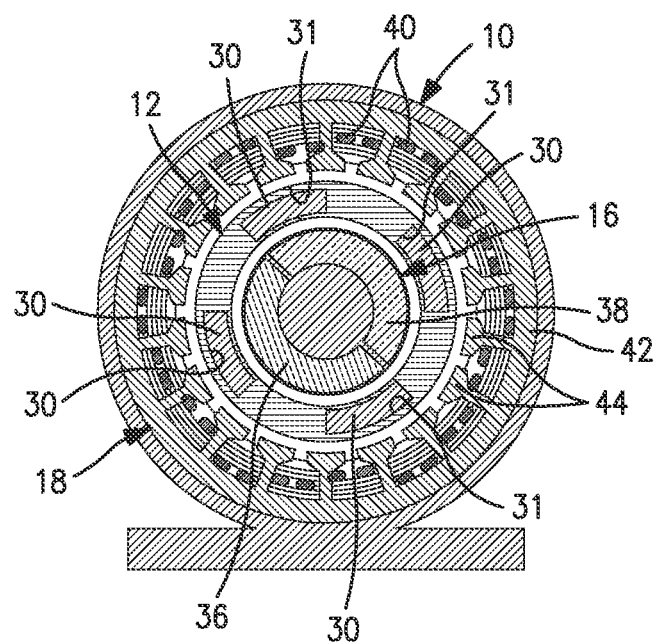
FIG. 2 is a sectional view of FIG. 1 taken along line 2-2 of FIG. 1.
Figure 3:
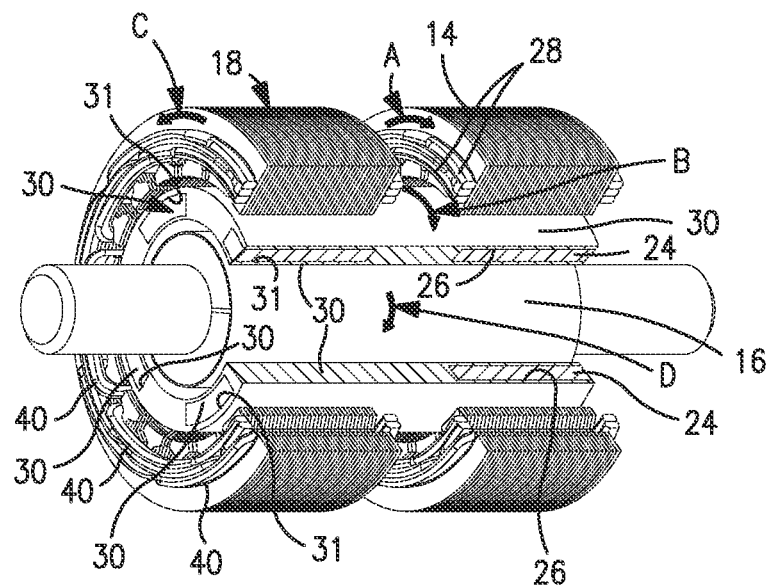
FIG. 3 is a fragmentary, perspective view of FIG. 1 with the motor casing and portions of the stators and low speed rotor removed.

With additional reference to FIGS. 2 and 3, low speed rotor 12 is of cylindrical configuration and formed of a non-ferrous material. Low speed rotor 12 is mounted within the motor casing 10 by means of bearings 20 and 22. The low speed rotor 12 has a first set of pole pieces 24, that are four in number, and that are mounted within end slots 26 provided at one end of the low speed rotor 12. The low speed rotor 12 is driven by the magnetic fields produced in the low speed stator 14 having a winding system 28. These magnetic fields are produced by a multiphase alternating current which is preferably, the well known and easily obtainable, three-phase alternating current. The application of such alternating current to the winding system 28 having separate windings electrically connected to the power source so as which are able to be separately exited by the separate phases of the alternating current, produce rotating magnetic fields that rotate in direction of arrowhead "A" shown in FIG. 3. The rotating magnetic fields in turn act upon the pole pieces 24 to rotate the low speed rotor 12 in the direction of the arrowhead "B" The rotation of the low speed rotor 12 will also rotate ferrous pieces 30 mounted at the other end of the low speed rotor 12 within end slots 31. It is understood that means other than end slots could be used to mount the pole pieces 24 and the ferrous pieces 30 on the low speed rotor 12 such as threaded connectors and the like. However, the ferrous pieces 30 must be insulated from one another and the low speed rotor 12 itself by either constructing the low speed rotor 12 of a non-ferrous alloy or by provision of an insulating layer on which the ferrous pieces 30 are mounted. Furthermore, although pole pieces 24 are magnets, it is understood that other types of rotors could be used such as an induction type of rotor. The same would be true for the high speed rotor 16.

The high speed rotor 16 is also mounted in the motor casing 10 for rotation by means of bearings 32 and 34. Such mounting positions the high speed rotor 16 in a coaxial relationship with and telescoped within the low speed rotor 12. The high speed rotor 16 has a pair of pole pieces 36 and 38 opposite to the ferrous pieces 30 of the low speed rotor 12 and the high speed stator 18. The high speed stator 18 is provided within a winding system 40 that again having separate windings that are electrically connected so as to be separately exited by an out-of-phase alternating current source, preferably a three-phase current source, that will produce magnetic fields rotating in a direction illustrated in FIG. 3 by arrowhead "C". However, motion of the ferrous pieces 30 produce a gearing effect to rotate the high speed rotor at a high speed than the speed of rotation of the magnetic fields and in an opposite direction as indicated by arrowhead "D".

Figure 4:
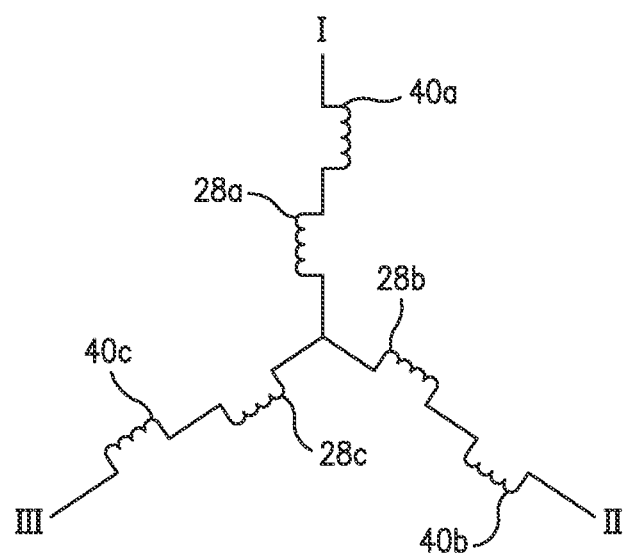
FIG. 4 is a schematic drawing of an electrical wiring diagram of the high and low speed stators used in the electric motor of FIG. 1.

With reference to FIG. 4, the systems of windings 28 and 40 can consist of separate windings for each of the three phases "I", "II" and "III" of the three-phase alternating current source. Thus, winding system 28 can consist of three separate windings 28a; 28b and 28c and winding system 40 can consist of three separate windings 40a; 40b; and 40c. The electrical connection of the winding system is in series so that for phase "I", windings 28a and 40a are connected in series, phase "II", windings 28b and 40b are connected in series and for phase "III", windings 28c and 40c are connected in series. In order for the fields to rotate in opposite directions, the systems of windings 28 and 40 are wound in opposite directions, for instance, windings 28a and 40a. As shown the windings 28a, 40a are able to be separately exited by phase "I", windings 28b and 40b are able to be separately exited by phase "II" and windings 28c and 40c are separately exited by phase "III". The rise and fall of the current of each of the phases and their out of phase nature results in the rotation of the magnetic fields as described above. The wiring diagraph shown in FIG. 4 is typical for a three-phase motor and is a "WYE" type. Other types such as a "DELTA" could also be used.

The low and high speed stator 14 and 18 are conventional stator materials of construction are the same as standard 3 phase electric motors where the system of windings 28 and 40 is wound about inwardly directed prongs of laminations formed from a magnetically conductive ferrous or ferrous alloy material, such as the lamination 42 and prongs 44 shown for high speed stator 18. The windings within the system of windings is also conventionally wound using an electrically conductive material such as copper or aluminum.

Figure 5:
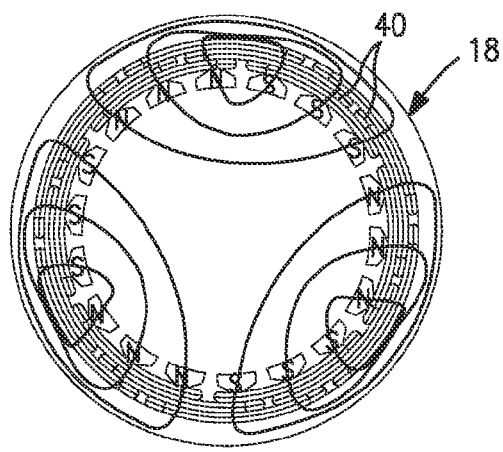
FIG. 5 is a fragmentary view of FIG. 2 with only the high speed stator to illustrate the principles behind the operation of the present invention.
Figure 6:
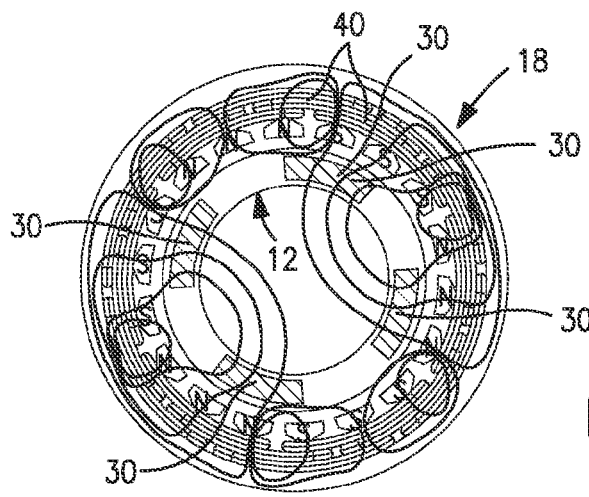
FIG. 6 is a fragmentary view of FIG. 2 with only the high speed stator and further including a stationary low speed rotor to further illustrate the principles behind the operation of the present invention.
Figure 7:
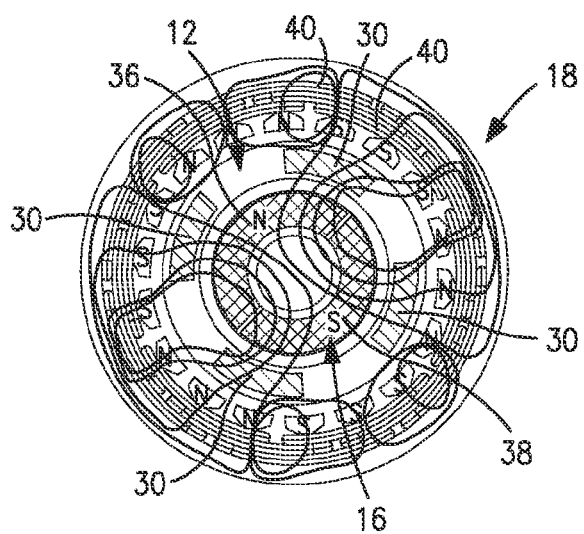
FIG. 7 is a fragmentary view of FIG. 2 with the components of the high speed stator, low speed rotor and high speed rotor being present to yet further illustrate the principles behind operation of the present invention.

With additional reference to FIG. 5, if the high speed stator 18 is viewed in isolation, it can be seen that it consists of three pole pairs. The rotational speed of the magnetic field is determined by conventional three phase motor theory in which the speed is given by the following equation: (60× input frequency)/number of pole pairs. If the three phase input has a frequency of 60 Hz for each phase, then the rotation speed of the magnetic field would be 1200 RPM. In FIG. 6, the effect of the ferrous pieces 30 is illustrated. As can be seen in this figure, the ferrous pieces 30 shape the three pole pairs into a single pole pair. The number of ferrous pieces is determined by the sum of the pole pairs of the high speed rotors and the high speed stator. In the electric motor 1, the count would be three pole pairs on the high speed stator 18 and one pole pair on the high speed rotor 16 for a total of four ferrous pieces 30. The resulting gear ratio with no rotation of the ferrous pieces 30 would be 3:1 for a three times speed increase. The speed of the high speed rotor 16 in such case would be given by the following equation: [(60×input frequency)/number of pole pairs]×gear ratio. Hence for a magnetic field rotating at 1200 RPM, the rotation speed of the high speed stator 16 would be 3600 RPM. With reference to FIG. 6, assuming now the slow speed rotor 12 is rotating in the direction of arrowhead "B" and the magnetic field through the high speed stator 18 is rotating in the direction of arrowhead "C", then the speed of rotation of the high speed rotor is given by the following equation: $[60(f)(1+(P1/P2))(P2/P3)]/P1$ where as illustrated, there are an even number of ferrous pieces 30 such as in the accompanying drawings. Where, however, there are an odd number of ferrous pieces, it is believed that the speed of rotation given by the foregoing equation would be increased in an amount equal to $60(f)/P2$; where f is the input frequency; P1 is the number of pole pairs on the high speed stator 18; P2 is the number of pole pairs on the low speed stator 14; and P3 is the number of pole pairs on the high speed rotor. In the foregoing example, the rotational speed would be equal to $[60*60(1+1)(3/1)]/3$ or 7200 RPM.

While the present invention has particular applicability to an electric motor such as has been described above, it has wider applicability. For instance, although very advantageously, the low and high speed stators 14 and 18 are wired together, they might be separated wired to the same or different power sources. Further, the present invention also encompasses the magnetic gear that would consist of the high speed stator 18, a low speed rotor having ferrous pieces, such as 30, and a high speed rotor such as high speed rotor 16. Such invention might be used in connection with an externally driven device such as a turbine driving the low speed rotor instead of a low speed stator 14 and pole pieces 24.

As will occur to those skilled in the art, although the present invention has been described with reference to preferred embodiments, number changes, additions and omissions could be made without departing from the spirit and scope of the present invention as set forth in the presently pending claims.

What is claimed is:
1. An electric motor comprising:
a motor casing;
a high speed stator and a low speed stator mounted within the motor casing side-by-side;
the high speed stator and the low speed stator each including winding systems having separate windings and electrical connections between the separate windings configured such that the separate windings are able to be separately exited by out-of-phase electrical currents generated by a multiphase alternating current source and thereby to produce magnetic fields emanating from stator pole pairs of the separate windings rotating around each of the high speed stator and the low speed stator in opposite directions when the windings are connected to the multiphase alternating current source;

a low speed rotor mounted within the motor casing for rotation, coaxial to and surrounded by the high speed stator and the low speed stator, the low speed rotor having a first set of pole pieces mounted at one end thereof and opposite to the low speed stator such that the magnetic fields produced by the low speed stator are able to induce a rotation of the low speed rotor in a rotation direction of the of the magnetic fields produced by the low speed stator and a set of ferrous pieces mounted at the other end and opposite to the high speed stator and separated from one another by non-ferrous regions of the low speed stator so as to be able to conduct the magnetic fields produced by the high speed stator;

a high speed rotor mounted within the motor casing for rotation coaxial to the low speed rotor and telescoped within the low speed rotor, the high speed rotor having a second set of pole pieces opposite to the ferrous pieces of the low speed rotor and the high speed stator; and the set of ferrous pieces of the low speed rotor present in a number equal to a sum of the stator pole pairs of the high speed stator and rotor pole pairs provided by the pole pieces of the high speed rotor so that motion of the ferrous pieces produced by the rotation of the low speed rotor in turn produces a gearing effect in which the high speed rotor rotates at a higher speed than the magnetic fields produced by the high speed stator and in an opposite direction thereto.

2. The electric motor of claim 1, wherein the higher speed of the high speed rotor is given by the equation $[60(f)(1+(P1:P2))(P1:P3)]/P1$ for an even number of ferrous pieces or the amount derived from the foregoing equation plus $60(f)/P2$ for an odd number of ferrous pieces;

where "f" is the frequency of the multiphase alternating current source; P1 is the number of pole pairs on the high speed stator; P2 is the number of pole pairs on the low speed stator and P3 is the number of pole pairs on the high speed rotor.

3. The electric motor of claim 1, wherein the multiphase alternating current source is a three phase alternating current source.

4. The electric motor of claim 3, wherein each of the first and second sets of the pole pieces are formed by permanent magnet materials.

5. The electric motor of claim 4, wherein windings of the high speed stator and the low speed stator are wound in opposite directions and are configured to share the multiphase alternating current source.

6. The electric motor of claim 5, wherein each of the high speed stator and the low speed stator are of laminated construction having inwardly directed prongs supporting the windings.

7. The electric motor of claim 5, wherein the low speed rotor is formed of a non-ferrous material and is of cylindrical configuration and the low speed rotor has cavities within which the first set of pole pieces and the ferrous pieces are mounted.

8. The electric motor of claim 7, wherein the high speed stator has three pole pairs, the high speed rotor has one rotor pole pair and there are four ferrous pieces on the low speed rotor.

9. The electric motor of claim 1, wherein windings of the high speed stator and the low speed stator are wound in opposite directions and are configured to share the multiphase alternating current source.

10. An electric motor and compressor assembly comprising:
a motor casing;
a high speed stator and a low speed stator mounted within the motor casing side-by-side;
the high speed stator and the low speed stator each including winding systems having separate windings and electrical connections between the separate windings configured such that the separate windings are able to be separately exited by out-of-phase electrical currents generated by a multiphase alternating current source and thereby to produce magnetic fields emanating from stator pole pairs of the separate windings rotating around each of the high speed stator and the low speed stator in opposite directions when the windings are connected to the multiphase alternating current source;
a low speed rotor mounted within the motor casing for rotation, coaxial to and surrounded by the high speed stator and the low speed stator, the low speed rotor having a first set of pole pieces mounted at one end thereof and opposite to the low speed stator such that the magnetic fields produced by the low speed stator are able to induce a rotation of the low speed rotor in a rotation direction of the of the magnetic fields produced by the low speed stator and a set of ferrous pieces mounted at the other end and opposite to the high speed stator and separated from one another by non-ferrous regions of the low speed stator so as to be able to conduct the magnetic fields produced by the high speed stator;
a high speed rotor mounted within the motor casing for rotation coaxial to the low speed rotor and telescoped within the low speed rotor, the high speed rotor having a second set of pole pieces opposite to the ferrous pieces of the low speed rotor and the high speed stator; and
the set of ferrous pieces of the low speed rotor present in a number equal to a sum of the stator pole pairs of the high speed stator and rotor pole pairs provided by the pole pieces of the high speed rotor so that motion of the ferrous pieces produced by the rotation of the low speed rotor in turn produces a gearing effect in which the high speed rotor rotates at a higher speed than the magnetic fields produced by the high speed stator and in an opposite direction theretopole pairs; and
a compressor directly coupled to the high speed rotor to compress a fluid within the process plant.

11. The electric motor and compressor assembly of claim 10, wherein the higher speed of the high speed rotor is given by the equation $[60(f)(1+(P1:P2))(P1:P3)]/P1$ for an even number of ferrous pieces or the amount derived from the foregoing equation plus $60(f)/P2$ for an odd number of ferrous pieces; where "f" is the frequency of the multiphase alternating current source; P1 is the number of pole pairs on the high speed stator; P2 is the number of pole pairs on the low speed stator and P3 is the number of pole pairs on the high speed rotor.

12. The electric motor and compressor assembly of claim 11, wherein the compressor is a centrifugal compressor.

13. The electric motor and compressor assembly of claim 12, wherein the compressor is configured to compress air.

14. A magnetic gear comprising:
a casing;
a stator mounted within the casing and including a winding system having separate windings and electrical connections between the separate windings configured such that the separate windings are able to be separately exited by out-of-phase electrical currents generated by a multiphase alternating current source and thereby to produce magnetic fields emanating from stator pole pairs of the separate windings rotating around the stator when the windings are connected to the multiphase alternating current source;
a low speed rotor mounted within the casing for rotation, coaxial to and surrounded by the stator, the low speed rotor having a set of ferrous pieces situated opposite to the high speed stator and separated from one another by non-ferrous regions of the low speed stator so as to be able to conduct the magnetic fields produced by the stator;
a high speed rotor mounted within the casing for rotation coaxial to the low speed rotor and telescoped within the low speed rotor, the high speed rotor having a set of pole pieces opposite to the ferrous pieces of the low speed rotor and the stator; and
the set of ferrous pieces of the low speed rotor present in a number equal to a sum of the stator pole pairs of the stator and rotor pole pairs provided by the pole pieces of the high speed rotor so that motion of the ferrous pieces produced by the rotation of the low speed rotor in turn produces a gearing effect in which the high speed rotor rotates at a higher speed than the magnetic fields produced by the stator and in an opposite direction thereto.

15. The magnetic gear of claim 14, wherein the multiphase alternating current source is a three phase alternating current source.

16. The magnetic gear of claim 15, wherein the stator is of laminated construction having inwardly directed prongs supporting the windings.

17. The magnetic gear of claim 16, wherein the low speed rotor is formed of a non-ferrous material and is of cylindrical configuration and the low speed rotor has cavities within which the first set of pole pieces and the ferrous pieces are mounted.

18. The magnetic gear of claim 17, wherein the stator has three pole pairs, the high speed rotor has one rotor pole pair and there are four ferrous pieces on the low speed rotor.

19. The magnetic gear of claim 14, wherein each of the pole pieces is formed by permanent magnet materials.

* * * * *